United States Patent [19]

Dethloff et al.

[11] Patent Number: 4,833,607
[45] Date of Patent: May 23, 1989

[54] APPARATUS AND METHOD TO CONTROL ECONOMICAL SYSTEMS

[75] Inventors: Juergen Dethloff; Christian Hinneberg, both of Hamberg, Fed. Rep. of Germany

[73] Assignee: Juergen Dethloff, Hamburg, Fed. Rep. of Germany

[21] Appl. No.: 94,288

[22] Filed: Sep. 8, 1987

[51] Int. Cl.⁴ .............................................. G06F 15/21
[52] U.S. Cl. .................................... 364/401; 364/409; 235/375
[58] Field of Search ................ 364/401, 406, 408, 409

Primary Examiner—Michael R. Fleming
Assistant Examiner—David M. Huntley
Attorney, Agent, or Firm—Notaro & Michalos

[57] ABSTRACT

The incentive and feedback apparatus includes a plurality of business stations, each having an incentive module and a transaction mechanism for conducting different types of transactions involving different types of products. The incentive module stores a plurality of indices that encode a business type, a product type and a transaction type. An incentive coefficient is identified with each index. Incentive coefficients of greater than 1 (positive) indicate a combination of business, plus product, plus transaction type, which is favored by the economy, while a coefficient of less than 1 (negative) indicates a combination which is considered less favorable. A coefficient of 1 indicates a neutral combination which has been judged neither favorable nor unfavorable. Each transaction is conducted at its market price. For example, a product sold at its correct amount is transferred at this price. During the transaction, however, the amount is multiplied by the coefficient corresponding to the index for that transaction. The difference is then calculated between the multiplication product and the original amount to give a number of incentive units, which are then accumulated and stored in a memory. Positive units above zero level can be used to obtain benefits determined and granted by the system. Data stored in the module can also be accumulated and concentrated at a central location to indicate the success of the incentive system and also indicate whether shifts in the coefficients re-programming the incentive module are necessary.

13 Claims, 3 Drawing Sheets

APPARATUS AND METHOD TO CONTROL ECONOMICAL SYSTEMS

CROSS REFERENCE TO RELATED APPLICATION

This application is related to a pending application to the same inventors, entitled: MULTI-USER ,AND VARIABLE VALUE CARD SYSTEM, filed Sept. 8, 1987 and having Ser. No. 094,379, which is incorporated here by reference.

FIELD AND BACKGROUND OF THE INVENTION

The present invention relates to electronic transaction and identification systems, and portable electronic transaction devices, such as cards, keys, modules, etc. and appertaining stationary equipment, such as terminals aand coding and transaction devices.

There are two main general economic systems:

Government controlled planning and checking (socialistic system) and private enterprise with the free market of supply and demand ("capitalism").

Both offer advantages and suffer drawbacks and inconveniences.

Attempts have been made to combine both. Such combinations remain experimental.

It is desirable to make any effort to optimize an economical system.

Every economic system is operated by human beings and is (or should be) designed for their benefit.

It is natural for human beings striving after benefits (or in the words of capitalism: after "profit"). By using this impetus, when the same human being is an operating member of the system, one can achieve higher efficiency than by applying force to him or her.

In no (economic) system neither in a highly industrialized one nor—especially—in a country with a developing industry—can rules be "catch-as-catch-can".

Thus, common sense requires a certain amount of planning, checking and control.

This again imposes some force on people and does not always stimulate individual initiative and cooperation.

Negative reactions on the side of the citizen result, to a considerable degree, from the fact that inconveniences and limitations are caused by other human beings and that it is human beings as well who appear to him or her as the authorities of control, checking and judgment—and very often he or she finds him or herself exposed to a bureaucrat's mercy.

Considering these psychological implications, it is, therefore, suggested to make the citizen subjectively feel liberated.

A system which is conceived as arbitrary in one way or the other, should be replaced by a system which appears to be just, fair, lawful and independent from an individual's momentary judgment, a system, which further is self-regulating by feedback.

For the sake of simplicity, the portable transaction devices will be referred to as "cards" "M-cards" or "modules". M-cards, for the purpose of this application, are plastic devices, comprising integrated circuits, commonly called "smart cards" or "chip cards". Such smart cards or chip cards contain electronic components in microstructure, i.e., integrated circuits. Devices of this nature have been disclosed in German patent DE No. 19 45 777 C3 to DETHLOFF, filed on Sept. 10, 1969.

SUMMARY OF THE INVENTION

In the present invention, a programmable module is used as part of a self-regulated (feedback) system, based on incentives. The inventive system ca have a significant impact on a country's economy. It can be related to a state of planned and controlled economy and to a so-called capitalistic or free enterprise economy alike.

Authorities in countries having planned and controlled economies tend to give certain room to individual initiative, thus allowing, to a certain degree, a stimulation of free enterprise. A move to more room for free enterprise, however, still requires a certain degree of central planning and control to favour certain businesses and specific industries which are deemed to be necessary for the development of the country and to dampen (attenuate) others, which, for instance, might promise more and faster profit to the individual, but may be of lesser importance to the economy of the country or of a specific region. This application of the present invention constitutes a tool for a synthesis of the economical theories of "planning and control" on the one hand, and "individual initiative and free enterprise" on the other.

The system of the present invention is referred to, in the following, as the feedback incentive system.

The system leaves behind the many—and often fruitless—theories on economic steering means.

It is our integrated system for practical use based on the synthesis of central planning and individual initiative.

The system can program, set objectives to control, check and optimize the economy.

Business and economy output and progress is controlled in accordance with the general settings and marks of a "general" business plan.

According to the invention, the system stimulates and rewards the individual and an enterprise in a fair way which is free from subjective, momentary decisions of individuals in control.

It may also be adapted to assist the operation and growth of public corporations or Government operated businesses.

The incentive apparatus and method is a tool to control the development and growth of a nations' economy, based on general central planning, opening the vast potential of the entrepreneurial individual, stimulating the efficiency of big organizations (public, semipublic or private) and satisfying the need to feed, clothe and house every member of the society evenly.

It is also immediately adaptable to changing conditions or amended settings and marks in the planning.

Such adaptations can be effected in accordance with development of the GNP, national input output ratio, and other general economic data or regional conditions.

It can grant fair privileges and set limitations to individuals and corporations and control the effects of both by the same token.

The feedback system is devised for central control and decentralized operation.

It is not limited to its role as a tool to control economy and business. It can also serve specific segments as a tourist and Travel System, which, for instance, organizes and controls such functions as electronic visa, accommodation, feeding, transportation, general payment and access to certain places, etc.

One embodiment of the system of the present invention for such application can, in principle, consist of the following structural components (assemblies):

a Central Planning and Controlling unit (CPC), a unit which is operated by governmental or other official authorities;

a number of Business Stations (BST), which are in the possession of participating business in the system;

Incentive Modules (IncMod), which are integral parts of the BSTs;

Interrogating, Concentrating and Updating Stations (ICUST), sub-stations of the CPC unit, which are preferably on-line with the CPC unit; an Transaction M-cards for payment transfers between off-line Business Stations (BSTs).

The CPC unit would normally be a suitably sized computer. In its data bank, the relevant economical planning data of the country or the region are stored. The BSTs perform financial transactions, i.e., they receive payments from customers' BSTs and effect payments to BSTs of suppliers.

The CPC unit contains the country's or region's general economic planning data. It determines which species of businesses and which kinds of transactions shall, according to the overall plan, be deemed to be favoured or be dampened or be treated in a neutral way. A business and product index (BPInd) is assigned to any business (company or firm) and its individual products. Such an index can be composed of the code for the specific kind of business, e.g., manufacturing of tool machinery, connected to a sub-code, which determines individual products, e.g., boring machine, lathe, grinding machine. The code further determines the geographic location of the business In other cases, where the business is, for example, not a manufacturer but a wholesaler, a sales organization or an export agent, the sub-code could designate the kind of transaction rather than a product, e.g., whether the merchandise will go to a domestic destination or whether it represents an export delivery.

The whole nomenclature of the species of businesses and products/services and purposes of transaction relevant to the economical system is stored in the CPC unit. Any participating business (company or firm) is equipped with a Business Station (BST), each comprising an Incentive Module (IncMod). Such BSTs should preferably be on-line in a communications network with other BSTs and also connected to ICUST stations. In cases where this is not possible, an M-card serves as a physical carrier of transactions from vendor's BST to payee's BST and vice versa.

The IncMod of a BST contains in a memory the BPInd of the BST's business (company or firm). The contents of said IncMod memory are unchangeable by the BST/IncMod holder. The data of the BPInd can only be altered under CPC control in an ICUST. The IncMod further includes a register, in which the various bssinesses and products indices (BPInds) are assigned to individual incentive coefficients (ICOs). Such incentive coefficients (ICOs) are numeric multiplicators, which may, for example, range from 1.4 through 1.0 to 0.7 (1.4; 1.3; 1.2; 1.1; 1.0; 0.9; 0.8; 0.7). It will be appreciated that, as there are relatively few such incentive coefficients, (multiplicators) groups of BPInds correlate with every ICO. The IncMod further comprises an incentive storage, an arithmetic calculator, a storage for transactions and input/output means for communication with other BSTs and with an ICUST.

IncMods, which are part of off-line BSTs, include a card-reader. The relevant BPInd of the business and the specific product or service or the kind of transaction, is affixed to each transaction amount.

By affixing the BPInd to the amount of any transaction, it is secured that both participating BSTs learn the BPInd from the other. Upon receipt of the BPInd, which is affixed to the amount payable the one way, and to the receipt going back from the receiving station to the paying station the other way, the incentive logic in the IncMod correlates in the BPInd:ICO register the received BPInd with the proper ICO. The IncMod logic then activates the arithmetic calculator to multiply the transaction amount with the ICO. The product results into a figure, which is either equal (when the ICO is 1.0) or higher, (when the ICO is greater than 1.0) or lower (when the ICO is smaller than 1.0) than the nominal amount of the transaction. The calculator then determines the difference between the calculated product and the (original) nominal amount of the transaction and whether this difference is positive or negative. The amount of the difference represents the incentive of the respective transaction. It is positive when the transaction is favoured by the general economic plan, and it is negative when the general economic plan determines the transaction to be less attractive.

The IncMod logic then enters the amount of the incentive with the affixed BPInd of the respective transaction into the incentive storage, unless the ICO was 1.0 and no difference resulted from the multiplication. Independently from the above described "incentive procedure" the logic enters the nominal amount of the transaction with the affixed BPInd of the respective transaction into the IncMod transaction storage for later evaluation by the CPC system. The positive and negative incentives are balanced against each other after each entry of an incentive, while the individual incentive amounts are maintained in the storage. The actual balance may be positive or negative. It is positive when the business has done more transactions which are favoured by the general economical plan than others which are deemed to be attenuated. When the business, has reached a sufficiently high positive balance in the incentive storage, it may then do a transaction, for instance, buying an imported car which is not favoured by the general economical plan. The negative incentive resulting from such a transaction can then partly, or in whole, be compensated by the positive balance in the incentive storage.

From time to time, the BSTs IncMod transaction storage is interrogated by the CPC system, preferably by regional interrogating, concentrating and updating stations (ICUST). In an on-line network, the interrogation is automatically initiated by the ICUST, while the data are gathered from off-line BSTs by physically carrying the removable and portable incentive module (IncMod) from the BST to the appropriate ICUST.

Upon interrogation of the IncMods o the BSTs of the CPC system's region, the transaction data of like businesses, like (or similar) products or services and like transactions are concentrated in the ICUST, business and product/service-wise and transaction-wise, and are then entered into the concentrated data storage of the ICUST.

From time to time, the concentrated data are transmitted from the ICUSTs to the central planning and control unit (CPC) of the country or the specific region. In the CPC, the data are evaluated and compared with planned data. The result reflects the actual development of the various species of businesses in the respective region or in the whole country. According to deviations from the planning data, the incentive values (the ICOs) of the businesses or organizations and for the products/services and transactions, can be adjusted, i.e., set higher or lower. Then they will be fed back to the individual IncMods. For this purpose, such adjusted data are transmitted to the ICUSTs where the relevant ICOs in the BPInd:ICO register will be changed. When an IncMod of a BST is in communication with an ICUST the relevant ICOs in the IncMod's BPInd:ICO register will automatically be updated and shall forthwith prevail. The incentive coefficients (ICOs) are variable values according to the present invention.

For the sake of better understanding, the system of business/product/transaction indices (BPInds) and the incentive coefficients (ICOs), shall now be described by example and in more detail. The term "product" is meant to include goods and services.

The indices for the different business, such as a motorcycle and perambulator manufacturer, a foreign car importer, a tool machine manufacturer, a wholesale organization, shall be designated by capital letters A-Y, while their products or services shall be designated by n digit numerals. For example:

a motorcycle and perambulator manufacturer shall b designated by the capital letter—F its product "motorcycle" shall be designated by the two numerals—14 the product "perambulator" shall be designated by the numerals—27

Thus, a transaction of this factory, dealing with motorcycles, will be designated by the index—F 14 and a transaction dealing with perambuaators will be designated by the index—F 27

As the general economic plan of the CPC unit does not only consider products and services, but also distinguishes between different kinds of transactions, such as sales for the domestic market and exports against foreign currency, the designation is subdivided by affixing—for example—a character to it. The character "d" shall stand for "domestic sale" and the character "e" shall stand for export.

Thus, there can be generated the following indices:
—F 14d (=domestic sale of motorcycles)
—F 14e (=export of motorcycles)
—F 27d (=domestic sale of perambulators)
—F 27e (=export of perambulators)

Now, the other side of a transaction shall be considered.

A wholesale organization for technical equipment shall be designated by—N its purchase for resale to domestic customers shall be designated by—d and its purchase for export against foreign currency shall be designated by—e Thus, a transaction where this wholesale organization purchases a domestic product for domestic resale will be designated by—N d while its purchase of a domestic product for subsequent export will be designated by—N e Now, the following examples demonstrate the assignment of incentive coefficients (ICOs) to the various businesses and products/services and transactions.

The general economic plan of the CPC unit determines:

production of motorcycles is desirable, because the working people of the specific region shall be made more mobile for commuting between home and working place; so the incentive coefficient (ICO) is set to 1.1;

as the export of motorcycles is even more desirable to improve the foreign trade balance and to earn foreign currency, the ICO is set to 1.2;

the production of perambulators is not desirable for domestic sale, as the government applies a restrictive birth control; the ICO is set to 0.8;

when perambulators, however, can be exported, the production is considered to be favourable; the ICO is set to 1.2.

The following is an example of how a table shall elucidate the principle of a business product/index: incentive coefficient register (CPInd:ICOR), where the left column shows indices of two products, both in themselves distinguished b the kind of transaction, i.e., for domestic sale (d) and for export (e). In the right hand column, the incentive coefficients are listed as they are assigned to the respective BPInds.

| business product/service | kind of transaction | incentive coefficients |
| --- | --- | --- |
| F 14 | d | 1.1 |
|  | e | 1.2 |
| F 27 | d | 0.8 |
|  | e | 1.2 |

In a transaction the BPInd is affixed to the amount in the Seller's BST. The request for payment (invoice stating the aforementioned amount with the BPInd) is transmitted to the payor's BST. In the payor's BST, the amount and the BPInd are stored. Together with its payment, the payer states its own BPInd together with the designation for the kind of transaction (in the present example "d" for "domestic" sale or "e" for "export").

The received amount is then booked in the sellers' BST general ledger (without its own and payee's BPInd). It is further stored with its own and payor's BPInds in seller's IncMod. In seller's IncMod the transaction amount is correlated to the relevant ICO and calculated as described before.

While specific embodiments of the invention have been shown and described in detail to illustrate the application of the principals of the invention, it will be understood that the invention may be embodied otherwise without departing from scch principals.

DESCRIPTION OF THE PREFERRED EMBODIMENT

FIGS. 1 through 5 show an example of an economic incentive system, where the economic system of a country or a region is controlled and optimized by a "closed loop" of actual business data collected by a central unit (CPC) and influencing such business data by a feedback of correcting control data from said central unit to the individual businesses. Such control data being variable values assignable to business (transaction) data. First, FIGS. 1 through 5 shall be explained, before the function of the system is illustrated.

Figure 1:
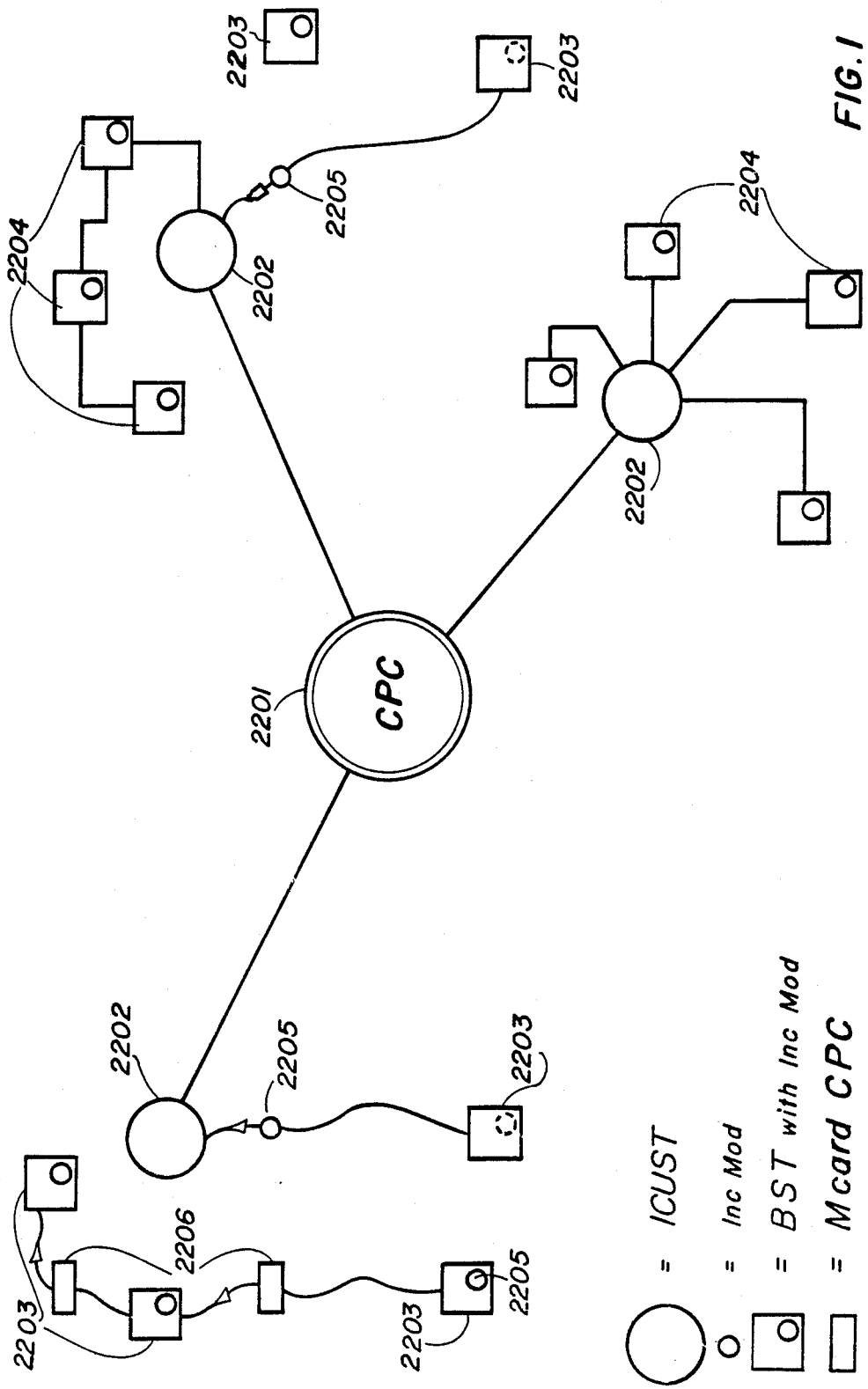
FIG. 1 is a schematic diagram of a central planning and controlling economic system (CPC) with feedback controlled variable values.

FIG. 1 is a schematic diagram of a central planning and controlling (CPC) system, wherein 2201 is a central computer with data banks and data files. 2202 are interrogating, concentrating and updating stations (ICUST). 2203 are off-line operated business stations (BST), each comprising an incentive module (IncMod) 2205. 2204 are on-line operated business stations (BST). 2205 are incentive modules (IncMod), which are part of BSTs, and removable and portable in off-line operated BSTs, while they are permanently built-in in on-line operated BSTs. 2206 are M-cards CCC for transactions between off-line operated business stations.

Figure 2:
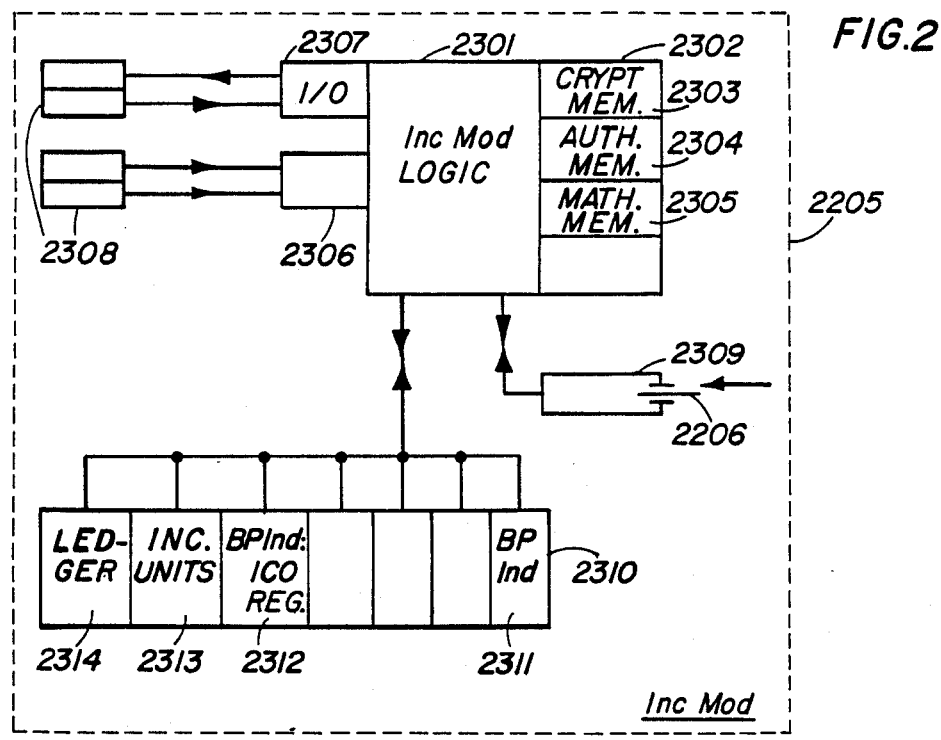
FIG. 2 is a block diagram of an incentive module (IncMod) in a CPCs system.

FIG. 2 shows an incentive module (IncMod) 2205 which includes a card reader 2309. The IncMod is in contact with the business station via connectors 2308. 2307 is an I/O device through which a serial data flow is channeled between the business station and the IncMod logic 2301. Program memory 2302 comprises program memory for an encryption/decryptio memory 2303, an authentication program memory 2304 and an arithmetic calculating program memory 2305. Working memory 2310 includes ledger memory 2314 for transactions with BPInds to be interrogated by the ICUST, storage 2313 for incentive units, BPInd/I/Co register 2312 and memory 2311 containing business stations own BPInd. IncMod logic 2301 controls, under the aforementioned program, IncMod's function.

Figure 3:
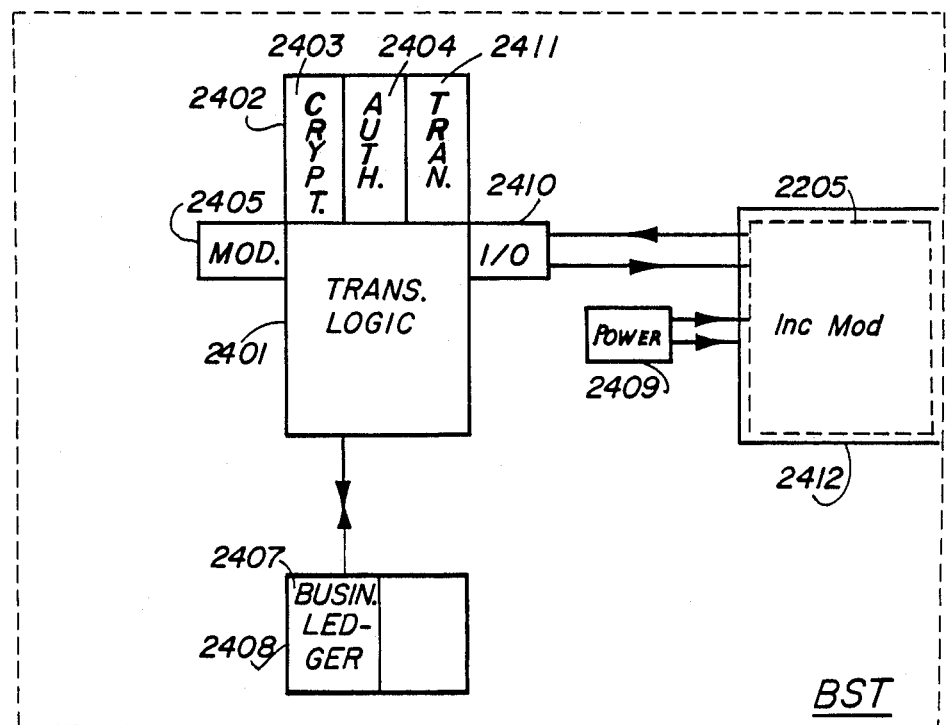
FIG. 3 is a block diagram of a business station (BST) comprising an incentive module (IncMod)

FIG. 3 shows business station BST 2203/2204, comprising IncMod 2205. When the business station is on-line operated, IncMod 2205 is permanently connected to business station 2204. When the business station 2203 is operated off-line, IncMod 2205 is removably received by IncMod acceptor 2412. In the latter case, power supply 2409 feeds the IncMod 2205, while the I/O device 2410 is responsible for serial data flow between the IncMod, and the business station. Transaction logic 2401 controls, under the programs in program memory 2402, the transactions and the ledger. In memory 2407 of working memory 2408, transmission module 2405 controls, when BST is in on-line mode, transactions between the business stations and data exchange between the business station and the ICUST.

Working memory 2402 comprises encryption and decryption program in memory 2403, authentication program in memory 2404 and the transaction program in memory 2411.

Figure 4:
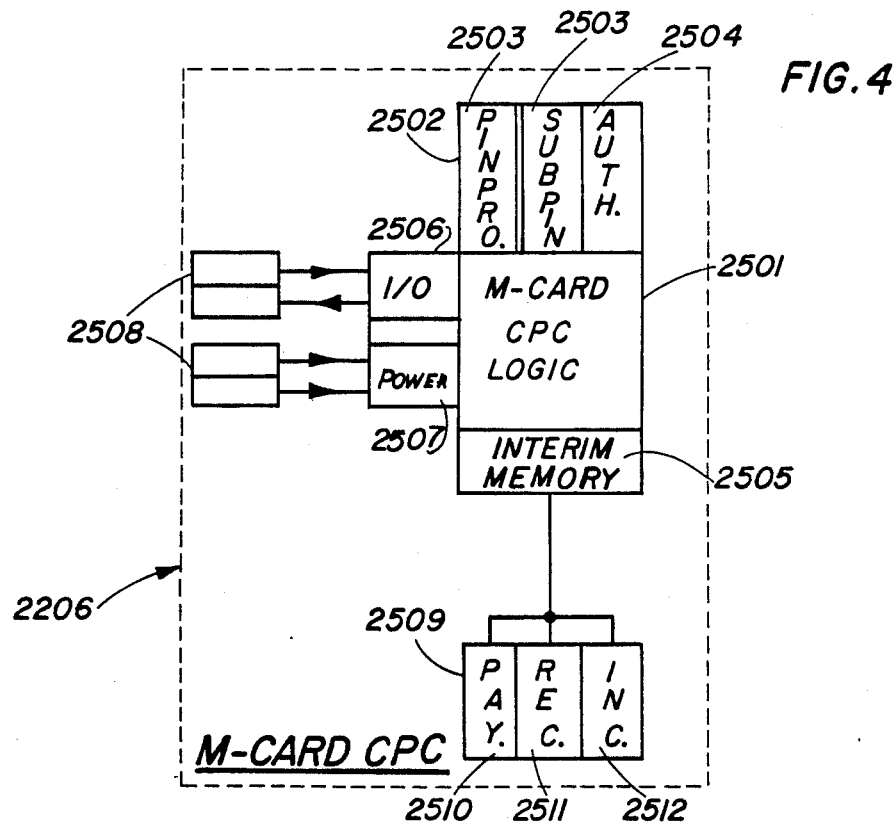
FIG. 4 is a block diagram of a transaction card in a CPC system.

FIG. 4 shows M-card CPC, which serves to transfer transaction amounts between business stations when one of them is, or both of them are in the off-line mode.

M-card CPC logic 2501 controls, under sub-user PIN program in memory 2503 and authentication program in memory 2504, both in PIN and program memory 2502 write-in and read-out into and from transaction memory 2509, comprising memory 2510 with amount of payment affixed by payor's BPInd, memory 2511 containing receipt for payment with payee's BPInd and memory 2512 possibly containing the amount of incentive units related to the specific payment. Memory 2503 contains the prevailing sub-user PIN, which is, for the time during identity check, stored in interim memory 2505. Connectors 2508 bring the card into contact with the respective BST. I/O device 2506 controls the serial data flow. Power supply 2507 is optional and can be embodied by a battery or the power is directly fed through connectors 2508 into logic, memories respectively.

Figure 5:
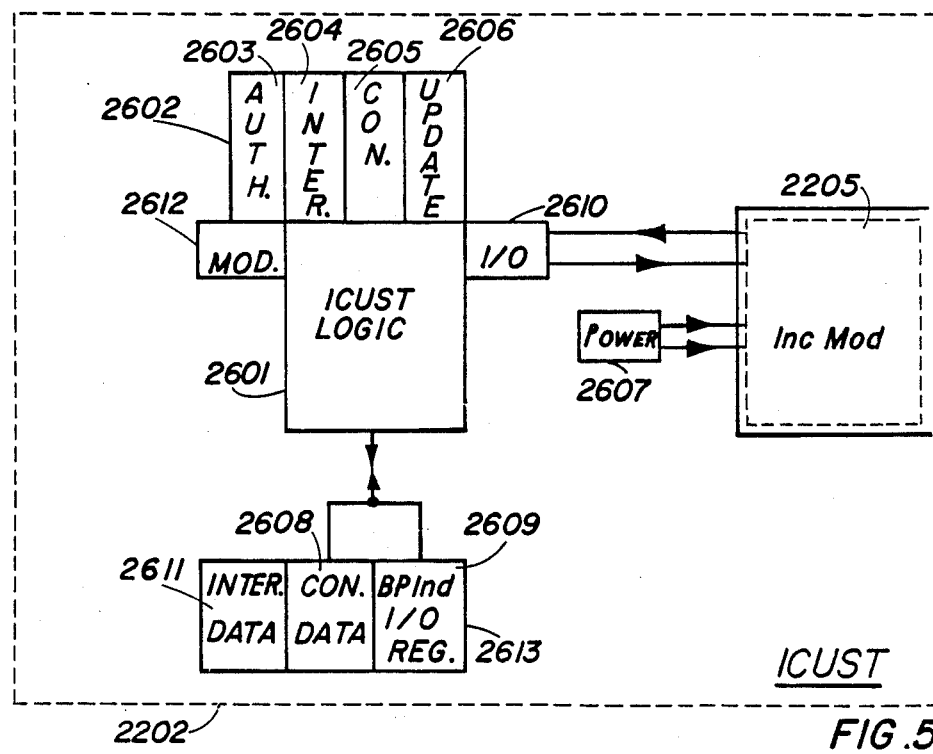
FIG. 5 is a block diagram of an interrogating, concentrating and updating station (ICUST) in a CPC system.

FIG. 5 shows an interrogating, concentrating and updating station (ICUST) 2202, when having received an IncMod 2205 for data exchange. Electric power is fed to the IncMod from power supply 2607. Serial data flows are controlled by I/O device 2610. Interrogating, concentrating and updating logic 2601 controls the function of the ICUST under the programs "authentication" in memory 2603, "Interrogation" in memory 2604, "concentration" in memory 2605 and "updating" in memory 2606, all in program memory 2602. Working memory 2613 comprises memory 2611 containing interrogated data, memory 2608 containing concentrated data, and memory 2609 containing BPInd/I/O register. Transmission module 2612 controls data exchange between the CPC unit and the ICUST.

In the following, the function of the CPC system is described. It is based on a "closed loop" of permanently adjusted variable values. Such variable values have been, and shall be, in the following, referred to as incentive coefficients (ICOs). The application of the present example is a country's or a region's economic system. In the central planning and controlling (CPC) unit 2201, which is centrally located, and preferably on-line with its substations (ICUST) 2202, incentive coefficients (ICOs) are set in accordance with the general economic plan. The general economic plan determines which kinds of businesses (production of goods or provision of services) shall be promoted or attenuated and what shall be the degree of either.

An ICO is a factor by which the nominal amount of a transaction is multiplied. The ICO can be 1.0, more than 1.0 or less than 1.0. Correspondingly, the product of the multiplication is either equal to the nominal transaction amount or less or more. When thereafter, the nominal amount is subtracted from the multiplication product, there will be either no difference (0), or a positive or a negative difference. Such differences shall be referred to as incentive units. The various businesses and their products or services are designated by business/product index (BPInd). The different kinds of transactions, e.g., domestic or export sale, are designated by an affixed code to the BPInd. All such BPInds and affixed codes are comprised in a general nomenclature, which is stored in a data bank of the CPC unit 2201.

The transmissions of data, such as BPInds, ICOs, transaction amounts and incentive units are secured by encryption and decryption in accordance with the state of the art. All stations, modules and cards, will undergo an authentication procedure and identify themselves before starting actual data transmission, again, in accordance with the state of the art, with one exception, however, which is the M-card identification as to the present invention.

Ween all data have been established in the CPC 2201, the BPInds and ICOs, as can be seen in FIG. 1, are distributed to the ICUSTs 2202, where the BPInds and the ICOs are stored in BPInd:ICO register 2609. The ICUST Logic 2601 effects transmission through its I/O device 2610 to the incentive module (IncMod) 2205 in the business stations BST 2203, 2204 respectively. The data transfer from the ICUST to the IncMod is either executed via data links, when business stations (BSTs) 2204 are on-line with the ICUST, or the IncMods of off-line BSTs are removed from the BSTs 2203 and physically plugged into the ICUST for data transfer.

The same way the individual BPInds for the businesses are distributed from tee CPC through the ICUSTS 2202 to the IncMods 2205, where the "own" BPInd of the business station is stored, the IncMod stores the BPInd through I/O device 2307 (FIG. 23) and under control of the IncMod logic 2301, in its "own" BPInd memory 2311.

Business station 2203, or 2204, is in practice, a combined accounting and transaction machine, which is additionally equipped with an incentive module (IncMod).

In FIG. 3, the blocks for the accounting procedure have been left off as not being relevant to the present invention. Only memory 2407 in working memory 2408 is shown as a business ledger, where transaction amounts are stored without affixed BPInds. All CPC relevant components are included in IncMods 2205. An off-line BST 2203 is only operable when the IncMod 2205 is physically and electrically connected to it. In an on-line BST 2204, a transaction is actually executed under the control of the IncMod logic 2301. The IncMod logic assigns, through I/O device 2307, to a (nominal) amount which is payable, its own BPInd, read from memory 2311. These data, the nominal amount and the affixed BPInd, are transmitted to payee's BST, where payee's BST in its transaction logic 2401 transfers amount and BPInd to its IncMod, where IncMod logic 2301 stores amount and BPInd in its transaction record memory 2314 of working memory 2310. BST's transaction logic 2401 by the same token, separates the amount from the BPInd and stores th amount in the BST's ledger memory 2407 in working memory 2408.

Payee's BST in payee's BSTs IncMod logic 2301 effects the transfer of payee's own BPInd read from 2311 to the working memory 2408, where it is combined with the confirmation of the amount's receipt to be transmitted through payee's transmission module 2405 to payor's transmission module 2405. When said confirmation is received by payor's BST, it will be transferred under the control of the IncMod logic 2301 to transaction memory 2314, where it is stored together with payee's BPInd. Then IncMod logic 2301, in both the seller's (payee's) and the payor's station, looks up in the BPInd:ICO register, the proper incentive coefficient (ICO) and activates the calculating program in memory 2305 to figure out the appropriate number of incentive units, which under the control of the IncMod logic 2301 are then stored in the incentive unit's storage 2313. Subsequently, the actual balance of incentive units is stored in parallel in incentive units memory 2313.

For transactions from or to an off-line BST 2203 to another off-line BST 2203 or to an on-line BST 2204, M-card CPC 2206, as shown in FIG. 4, serves as a transaction medium. For such transactions, M-card CPC 2206 is inserted into payor's card-reader 2309, the latter being part of the IncMod 2205, as shown in FIG. 2. The nominal transaction amount is fed from transaction memory 2408 in the BST, under the control of transaction logic 2401 to IncMod transaction account 2314, where it is under the control of IncMod logic 2301, combined with payor's BPInd read out from BPInd memory 2311. Then IncMod logic effects the readout of the transaction amount with the affixed "own" BPInd and the entering of said amount with its "own"

BPInd through card-reader 2309 into memory 2510 (now containing the transaction amount with payor's BPInd) in transaction memory 2509. Then M-card CPC 2206 is assigned to a (sub)-user in a way as described before. It is essential that the M-card CPC is assignable to different sub-users, as it is practically impossible that only one person in a business (company or firm) can carry the M-card CPC himself/herself for any transaction from his/her (own) BST to the various payees'BSTs. Thus, one or two persons in a business are authorized in lie of "the cardholder" to assign the right of acting as a sub-user to n number of third persons.

When the M-card CPC is received by the payee's card-reader 2309, the IncMod logic 2301 activates transaction program 2411 to read out the transaction amount together with the affixed payor's BPInd from the transaction memory 2510 in the M-card CPC, and to enter same into transaction memory 2314 in the IncMod 2205 and further channels it through the BST's transaction memory 2407, while transaction logic 2401 under the control of the transaction program in memory 2411 separates the BPInd from the nominal transaction amount, so that only the nominal amount is stored. Then transaction logic 2401 under the control of the transaction program in memory 2411, feeds the receipt of the nominal transaction amount through the IncMod card-reader 2309 into receipt memory 2511 of the M-card CPC, while the logic 2301 affixes to the receipt the payee's "own" BPInd read out from memory 2311, so that memory 2511 in the M-card CPC now contains the receipt of the nominal transaction amount with the affix of payee's BPInd.

When M-card CPC is back at its own BST, the receipt is read out from the card and is entered together with the payee's BPInd into transaction memory 2314, while by transaction logic 2401 in the BST, the receipt of the transaction amount is separated from the payee's BPInd and entered into the BST's transaction memory 2407. Then IncMod logic 2301 effects the calculation of the incentive units—if any—as described before and enters them into IncMods memory 2313.

When a sufficient number of incentvve units have been accumulated in incentive unit storage 2313, the business can make use of them in the following way.

The general economic plan, in principle, does not prevent businesses (companies, firms) or individual entrepreneurs from buying high standard or deluxe products. However, it requires the buyer to provide, in addition to the nominal amount (price) of the product, a certain number of incentive units. To effect such transaction, the IncMod logic 2301 is activated to transfer the necessary number of incentive units from incentive units memory 2313 to payee's BST, where the transaction as to the nominal amount is handled in the way described before; the incentive units of such a transaction will be cancelled under the control of the payee's IncMod logic 2301. The payee here is the seller of the high standard product.

From time to time, the ICUST 2203, as shown in FIG. 5, interrogates memory 2314 of the IncMods in the BSTs placed in the sub-region of such ICUST. Memory 2314 contains a ledger-like record of all transactions, the individual amounts affixed with the corresponding BPInds of the transaction. The interrogation is either effected via data links, when the BSTs 2204 are on-line, or the IncMods are removed from off-line BSTs 2203 and carried to the appropriate ICUST and plugged therein.

Interrogating logic 2601, under the control of the interrogation program in memory 2604, requests, via transmission device 2612, and I/O device 2610, the readout from the IncMods transaction memory 2314. The whole record is then transferred and entered into the ICUSTs interrogated data file 2611, where all such records from different BSTs are aggregated. The concentration program in memory 2605 then causes concentrating logic 2601 to add up all transaction amounts, which are designated by the same affixed BPInd. The resulting figures are entered into concentrated data file 2608. The CPC unit then interrogates, from tim to time, the concentrated data files 2608 of the various ICUSTs and concentrates them likewise, and evaluates them by comparing the actual data with the planned data. To correct deviations or when the general plan, has been altered, the CPC unit feeds back adjustments of relevant BPInd:ICO ratios. Such adjustment data will be received by the ICUST via transmission device 2612 and the updating logic 2601 under the control of updating program in memory 2606 adjusts the respective figures and designations in BPInd:ICO register 2609.

When a communication or connection is established with a IncMod, the updating program in memory 2606 will be activated by updating logic 2601 to effect corresponding adjustments in the IncMods BPInd:ICO register in memory 2312. Next time, when IncMod logic 2301 activates the calculation program in memory 2305 to figure incentive units, adjusted ICOs will prevail.

The system of FIGS. 1-5 can also have applications in so-called "capitalistic" economies. The invention could, for example, be used in the context of economised Kenneth Gailbraith's suggestion to pay variably valued jobless compensations in correspondence with an area, i.e., higher amounts in an area where there is a high rate of jobless people to prevent the breakdown of the economy in that area. This is mainly with regard to grocery stores and the like. This considers also the fact that it is more difficult to find a job in such areas of low labour demand. In such an application, the coefficient is stored in a terminal (cash dispenser or the like) and not in the card to prevent a cardholder from a low rate area from cashing money in a high rate area. The index would then be stored in the card.

The invention claimed is:

1. An economic incentive and feedback apparatus comprising;
   a plurality of business stations, each having transaction means for conducting different types of transactions involving different types of products to be transferred at selected amounts, the products being identified with a business type for its business station;
   an incentive module, in each business station, having memory means for storing a plurality of indices, each encoding a business, plus product, plus transaction type combination, and an incentive coefficient, for each index, which is greater than one for combinations to be promoted and less than one for combinations to be attenuated; and
   calculating means in said business station for multiplying the selected amount for each product involved with a transaction a said business station, by the incentive coefficient identified with the product in its combination of business and transaction types to yield a quantity.

2. An apparatus according to claim 1 wherein said calculating means calculates the difference between the selected amount and the quantity to determine a number of incentive units for the transaction.

3. An apparatus according to claim 2 wherein said memory means of said incentive module stores an accumulation of incentive units for a plurality of transactions.

4. An apparatus according to claim 1 wherein said memory means stores ledger data for a plurality of transactions.

5. An apparatus according to claim 4 including an interrogating station connectable to the incentive module of each business station for interrogating said memory means, for accumulating data on transactions for said business stations and for changing said incentive coefficients according to changes in business, product and transaction type combinations to be promoted and attenuated.

6. An apparatus according to claim 5 wherein at least some of said incentive modules are removable from their business stations and engagable with said interrogation station.

7. An apparatus according to claim 5 wherein at least some of said incentive modules are permanently installed in their business stations, said incentive modules with their business stations being connected on-line to said interrogation station.

8. An apparatus according to claim 1 wherein each incentive module includes a card reader, said apparatus including a plurality of multi-user cards, each incentive module including authenticating means for reading and verifying the authenticity of multiple personal identification codes, said multi-user cards each having means for staring such multiple personal identification codes.

9. A method of operating an incentive and feedback apparatus having a plurality of business stations and involving products, including goods and services for transfer among a plurality of businesses of different business types at least some of which supply said products and which can be transferred by a plurality of transaction types, comprising:
   designating an index for each combination of business type plus product, if supplied by that business type, plus transaction type;
   identifying an incentive coefficient for each index, the incentive coefficient being greater than one for indices representing combinations that are to be promoted and less than one for indices representing combinations which are to be attenuated;
   storing, at a business station, indices for the products of a business type and the transaction types, plus the incentive coefficient for each of the indices;
   multiplying at each business station and for each transaction, a selected amount of a product to be transferred by the incentive coefficient to yield a quantity.

10. A method according to claim 9 including calculating the difference between the quantity and the selected amount for the product to be transferred to yield a number of incentive units for that transaction, and accumulating the incentive units at each business station.

11. A method according to claim 10 including storing the indices, their incentive coefficients and the accumulated incentive units on an incentive module which is connected to the business station, storing in the incentive module data on all the transactions conducted at the business station including the index and incentive coefficient for each transaction, and connecting the incentive module to an interrogation station remote from the business station for accumulating data from a plurality of incentive modules for determining the effectiveness of promoting and attenuating the combinations.

12. A method according to claim 11 including changing the incentive co-efficient for at least some indices as a result of the determination of the effectiveness of promoting an attenuating the combinations.

13. A method according to claim 9 wherein at least one business station has an incentive module for storing the indices and including connecting a multi-user card to the incentive module of the business station for conducting a transaction at the business station.

* * * * *